May 10, 1938.  F. G. COTTRELL  2,116,509
ELECTRIC FILTRATION SYSTEM
Filed Oct. 2, 1933  2 Sheets-Sheet 1

INVENTOR:
FREDERICK GARDNER COTTRELL
By
ATTORNEY.

May 10, 1938.　　　F. G. COTTRELL　　　2,116,509
ELECTRIC FILTRATION SYSTEM
Filed Oct. 2, 1933　　　2 Sheets-Sheet 2
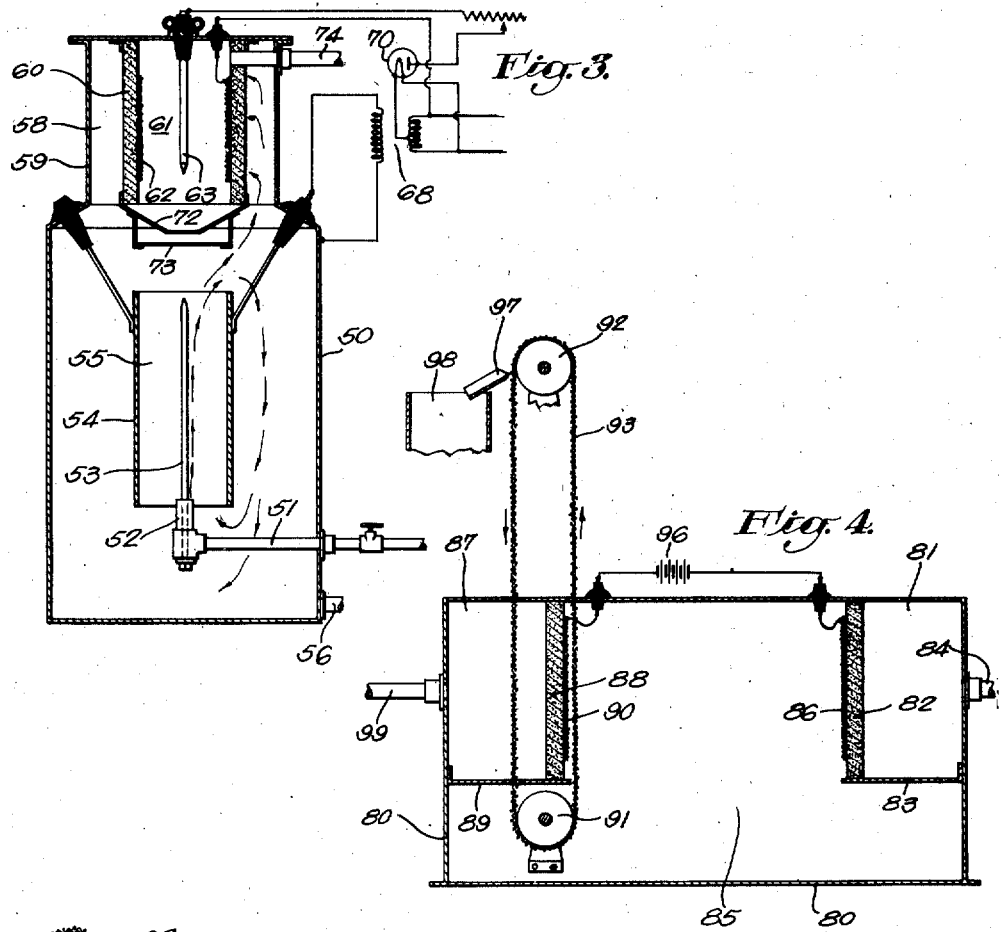
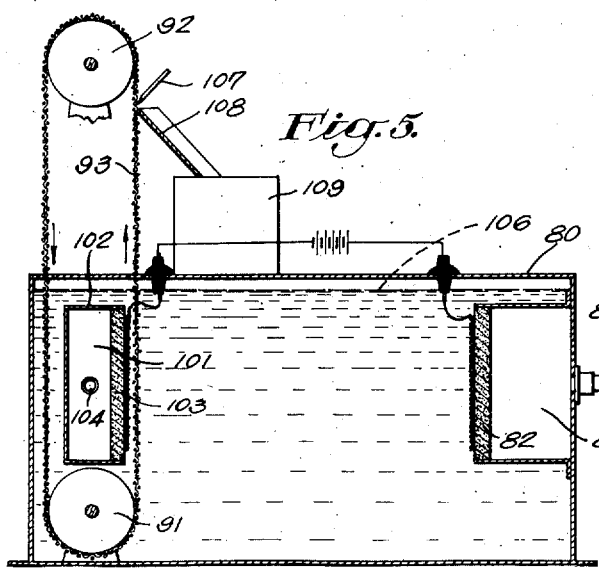
INVENTOR
FREDERICK GARDNER COTTRELL
ATTORNEY Patented May 10, 1938

2,116,509

UNITED STATES PATENT OFFICE 2,116,509

ELECTRIC FILTRATION SYSTEM

Frederick Gardner Cottrell, Washington, D. C., assignor to Petroleum Rectifying Company of California, Los Angeles, Calif., a corporation of California Application October 2, 1933, Serial No. 691,806

22 Claims. (Cl. 204—24)

This invention relates to a method and apparatus for removing foreign material from a liquid by the use of an electric field which is preferably of a unidirectional character. More particularly, the invention comprehends the application of cataphoretic principles in a novel manner.

The problem of separating foreign material from a liquid phase has been long recognized. Attempts have been made to move such foreign material from the liquid by application of a unidirectional electric field so that the foreign particles migrate toward one or the other of the electrodes where they are deposited. However, it is seldom possible to remove all traces of this foreign material. For this reason I have found it desirable to utilize a filter material in conjunction with an electric field, and such a system is included among the objects of the present invention.

Another feature of the invention is to maintain an electric field adjacent a filter surface so that at least a portion of the foreign material is moved away from this surface through cataphoretic action, thus preventing accumulation of a large quantity of the foreign material on the filter itself. In this way it is possible to eliminate much of the frequent cleaning of a filter surface such as is necessary in existing processes wherein filtration alone is utilized for separating the foreign material.

Another feature of the present invention is to move the mixture through a distributing member, and to set up an electric field into which the mixture moves, this field acting to stop or completely reverse the direction of movement of the foreign material in the mixture. The field can be so designed as to return this foreign material to the distributing member from which it came.

Another feature of the present invention resides in the use of a movable member on which the foreign material is deposited so that this member can be removed from the fluid either continuously or intermittently so that a cleaning thereof can be effected and so as to present new surfaces to the fluid.

It should not be understood, however, that it is in all instances necessary to utilize an electric field of sufficient intensity to cause foreign material to deposit on one or the other of the electrodes. The invention also comprehends a process wherein the electric field maintains the foreign material suspended therein while the liquid phase can flow therethrough, this foreign material remaining in the field and increasing the concentration therein until such time as it becomes desirable to remove this concentrated material therefrom.

By proper design of the system it becomes possible to maintain in the electric field foreign particles which are both positively and negatively charged, as will be hereinafter set forth, and one of the features of the present invention is to subject the incoming mixture to such a field whereby the oppositely charged particles not only tend to themselves neutralize and thus form larger masses, but also tend to contact the dispersed particles of the incoming mixture to unite therewith in forming masses of larger size.

One process with which the present invention finds particular utility is the electrical dehydration of petroleum emulsions. Such a conventional dehydrating process includes the building up of an electric field, usually of alternating character and of high intensity, so as to coalesce dispersed water droplets of the petroleum emulsion into masses of sufficient size to gravitate from the oil. The meeting of present commercial standards requires that such a dehydration system reduce the water content of the oil to at least 3%. In many instances, however, it is desirable to remove even a greater proportion of the water, and it is in this capacity that the present invention can be utilized, the emulsion being first subjected to an alternating current field and later subjected to a unidirectional field after a certain amount of settling has taken place.

The above and still further features and objects of the invention will be evident to those skilled in the art from the following description.

Referring to the drawings:

Fig. 1 diagrammatically illustrates the simple form of treater capable of carrying out the process.

Fig. 3 is an alternative form of combined treater and dehydrator.

Figs. 4 and 5 are alternative forms of the treater shown in Fig. 1.

Figure 1:
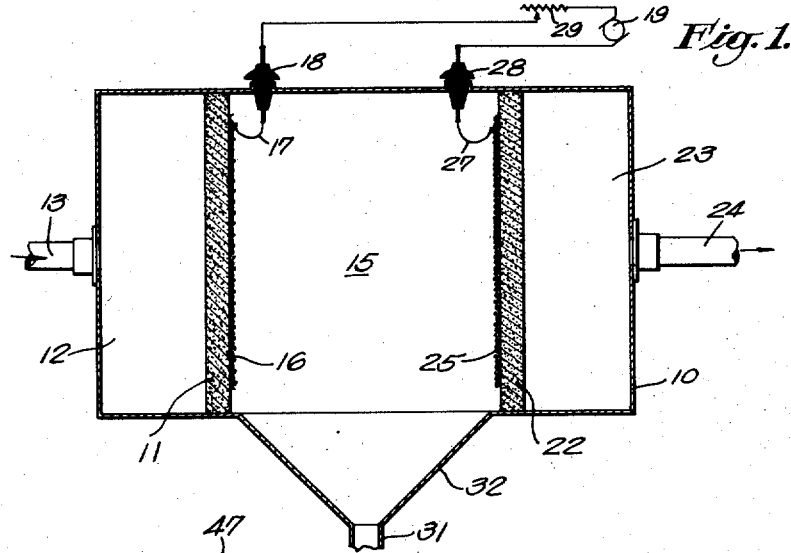

Referring particularly to Fig. 1, I have diagrammatically shown a tank 10 across which a porous member 11 extends to define an intake chamber 12 to which the incoming mixture is supplied through a pipe 13. This porous member is preferably one having relatively good electrical insulating properties and is relatively coarse-grained to provide interstices which are of greater size than the dispersed particles of the incoming mixture. This mixture may thus move through the porous member 11 and into a treating space 15 without substantial accumulation of the foreign material on the intake surface of this porous member. So also, if the foreign material is in the form of a dispersed liquid, the provision of interstices in the porous member 11 of larger size than the dispersed droplets will prevent any further subdivision of these droplets as the mixture moves through this member.

An electric field is set up in the treating space 15 by any suitable means. In the form shown the porous member 11 supports an interstitial electrode 16 which extends only partially across this member so that the end portions of this porous member act to insulate the electrode from the tank. It is possible to form this electrode by various means. Thus, the porous surface of the member 11 can be sprayed or otherwise coated with a metallic substance to form the interstitial electrode 16, care being exercised not to deposit sufficient conducting material to close the interstices of this porous member. In other instances it is possible to mount a metallic screen or perforated plate along this surface of the porous member 11, as diagrammatically shown in Fig. 1. In any event a conductor 17 supplies a potential to this electrode 16 and extends through a suitable bushing 18 and to one terminal of a generator 19 preferably of the direct-current type.

A filter plate 22 extends across the tank 10 and separates the treating space 15 from a discharge chamber 23 communicating with a pipe 24. This filter plate is preferably formed of a filter material having only very minute pores. Usually it is desirable to utilize a filter plate which would in itself filter from the mixture some or all of the foreign material of the mixture. The material forming this filter plate may be one having good electrical insulating properties so as to itself act as an insulated support for an interstitial electrode 25 extending therealong but spaced from the tank 10. This interstitial electrode may be formed in a manner similar to the electrode 16 so that the liquid of the mixture can readily pass therethrough. A conductor 27 energizes this electrode and extends through a bushing 28 and is also connected to the generator 19. This generator may be of the variable-voltage type whereby the potential between the electrodes 16 and 25 may be varied. If desired, a variable resistance 29 may be inserted in series with this generator to control this potential.

In the operation of this form of the invention the mixture to be treated enters the intake chamber 12 through the pipe 13, and the porous member 11 acts as a distributing means for discharging this mixture into the treating space 15. In the absence of any electric field in this treating space, this mixture will move rightward thereacross at a uniform velocity and the foreign material will be deposited on the surface of the filter plate 22, the liquid flowing therethrough and being withdrawn through the pipe 24. If an electric field is impressed between the electrodes 16 and 25, the action on the foreign particles will depend upon the inherent charge thereon. The field can be built up so as to either increase or retard the normal movement of these foreign particles as they are carried along with the liquid. Usually I find it preferable to utilize an electric field which acts not only to retard the forward movement of these foreign particles toward the filter plate 22, but actually to prevent such forward movement and in most instances return the foreign particles toward the porous member 11 from which they have emerged. The field can be made sufficiently intense to actually deposit the foreign material on the porous member 11, allowing substantially pure liquid to move rightward and through the filter plate 22. Any remaining foreign particles not separated by the electric field will of course be deposited on the filter plate 22.

One of the primary advantages accruing from such a process is that the foreign material is deposited upon the porous member 11 as distinguished from the filter plate 22 which would become quickly clogged by such a deposit. The pores of the member 11 are relatively large and are not easily closed by a deposit of the foreign material, even if this foreign material is in the form of a solid substance. If the foreign material is in the form of a liquid, at least a portion of this liquid will come into contact with the porous member 11 or the electrode and may move downward therealong by gravitational force if the liquid thus accumulated is of greater density than the continuous phase of the mixture, and will move upward if of less density.

The electrodes 16 and 25 do not form fields of uniform gradient thereadjacent. Instead, the field is concentrated at sections along the metallic members of the screen, or adjacent the crests or minute edges of the electrodes. Thus, while some of the foreign material will be deposited on the porous member 11 or the electrode 16, other of the foreign particles will be subjected to a somewhat different action as they move leftward against the rightward flowing stream of liquid. When these particles come into the vicinity of one of the high field-intensity portions of the field adjacent the electrode 16, they appear to come into electrical contact therewith, thereby receiving the charge of the electrode, and are then repelled from the electrode in the direction of flow of the mixture through the treating space 15. Apparently, the field conditions adjacent the electrode 16 control this action. Thus the system may be so designed and operated that some of the foreign particles reaching the most intense portions of the field are subsequently discharged from the vicinity of the electrode 16 rather than clinging thereto, these particles thus discharged of course moving toward the electrode 25 which is of opposite sign. In fact, they move through the treating space 15 at a velocity controlled both by the electric field and the stream of mixture, these particles thus having a net velocity which is higher than the mixture. Some of these particles may come into contact with the electrode 25 and be thereon deposited. Other of these particles will be repelled from the electrode 25 after they have come into electrical contact therewith and have thus received a charge which is opposite in sign to the charge which they possess when moving rightward. The net effect is that the treating space 15 contains particles of foreign material some of which are charged positively and some of which are charged negatively. There is a force tending to bring such oppositely charged particles into contact with each other if they are sufficiently close. The result is of course that such particles join together and the charges thereon are substantially neutralized. If the particles comprise liquid droplets they coalesce and thus tend to drop in the treating space 15, being possibly contacted during their downward movement by other charged particles of the foreign material moving between the electrodes. So also, the charged particles thus moving in the field tend to come into contact with the particles of foreign material newly introduced into the field, thus tending to facilitate separation thereof.

On the other hand, the field will contain charged particles which move therein without becoming neutralized and which particles will travel back and forth in the field. This is shown by the fact that the material in the treating space 15 increases in concentration as treatment progresses. Thus, in some instances substantially all of the foreign material is deposited on the electrodes, but in other instances a portion of this foreign material remains suspended in the treating space so that eventually it is desirable to remove the concentrated material therefrom. This may be done intermittently, the material being moved through a pipe 31 communicating with a funnel 32 of the tank 10. In other instances it is possible to continuously remove a small portion of the liquid in the treating space 15 through the pipe 31.

Figure 2:
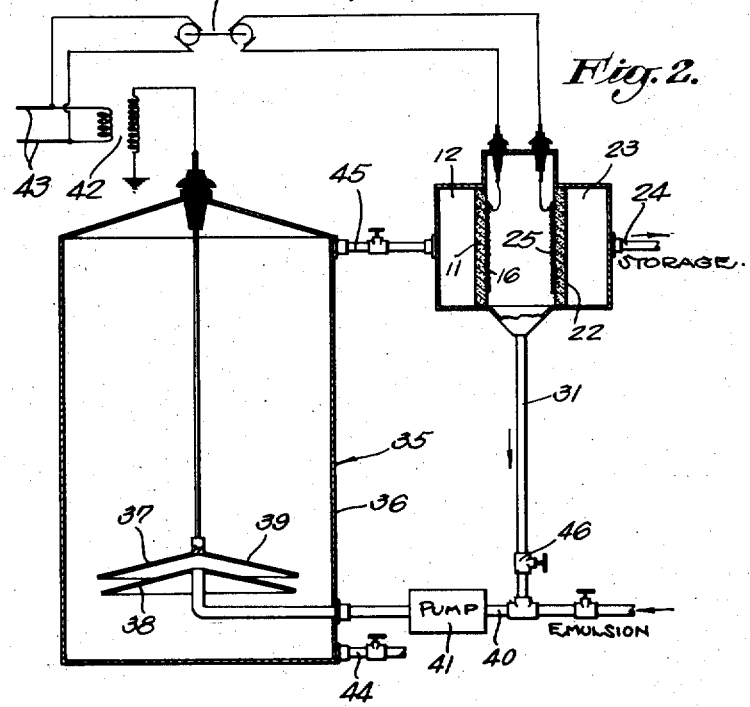
Fig. 2 illustrates the treating system in conjunction with an electric dehydrator.

Referring to Fig. 2 I have illustrated a treating apparatus similar to that shown in Fig. 1 as used in conjunction with an electric dehydrator 35. This dehydrator may be of conventional construction including a tank 36 in which live and grounded electrodes 37 and 38 are respectively positioned to define a treating space 39. The incoming emulsion is delivered through a pipe 40 to a pump 41 which forces it into the treating space 39 where it is subjected to an electric field set up by a transformer 42 connected to supply lines 43 as shown. This field acts to coalesce the dispersed water particles of the incoming emulsion, and the coalesced masses settle in the tank 36 and are withdrawn through a pipe 44. The oil rises in the tank 36 and is withdrawn through a pipe 45. This oil is not, however, usually in a pure state, but carries a small percentage of water therewith.

A treater similar to that shown in Fig. 1 is illustrated as being connected to the pipe 45 so that this mixture of oil and water flows therethrough as previously described. The pipe 31 of this treater preferably communicates with the intake of the pump 41 and includes a valve 46 controlling the flow therethrough. The pump 41 thus can be used to draw the water or other mixture from the treater and return this to the electric field of the dehydrator for further treatment or disposal. The dry oil moves through the pipe 24 of the treater to a suitable storage means. In this form of the invention I have illustrated a motor-generator set 47 connected to the supply lines 43 and supplying the potential to the electrodes 16 and 25.

In the form of the invention shown in Fig. 3, both treaters are enclosed in a single tank 50. Here the incoming emulsion moves through a pipe 51 and through a nozzle 52 surrounding a rod electrode 53 maintained at ground potential. A live electrode in the form of a shield 54 is positioned therearound, cooperating therewith in defining a treating space 55 in which coalescence takes place. The heavier constituent of the emulsion is moved from the tank 50 through a pipe 56, while the substantially dry oil moves upward into a chamber 58 defined between a dome 59 and a porous member 60. This material then moves through the porous member and into a treating space 61 wherein a unidirectional field is preferably established. In this form an interstitial electrode 62, corresponding to the electrode 16 previously described, is shown as being placed immediately inside the porous member 60. A central electrode 63 of relatively small size extends therein. Any suitable means may be utilized for setting up a unidirectional field in the space between electrodes 62 and 63. In the form shown I have illustrated a transformer 68 as supplying alternating current to the electrodes 53 and 54, and a vacuum tube or other rectifying device 70 connected to the incoming line and delivering unidirectional current to the electrodes 62 and 63. If desired a suitable choke and filter system may be used in conjunction with the rectifying device 70 so as to eliminate some or all of the ripples which would otherwise appear in the potential delivered to these electrodes.

In this form of the invention the oil, together with a minute amount of water carried therewith, moves through the porous member and through the electrode 62 and into the electric field. This field is preferably designed to move the dispersed particles of water toward the electrode 63 so that this water can coalesce around this electrode and drop from the lower end thereof and into a funnel 72 which discharges above a distributor plate 73, thus preventing direct return of this water to the treating space 55 but delivering same to the field around the electrode 54. In other instances, however, it is possible to reverse the connections on the electrode so that the water particles will be moved toward the outer electrode 62, flowing therealong and into the funnel 72. In any event the dry oil is removed through a pipe 74 and delivered to a suitable storage.

This form of the invention utilizes a field which is more intense adjacent the central electrode 63 than adjacent the electrode 62, this field being thus of non-uniform intensity. Such an electrode structure is often advantageous when certain types of mixtures are being treated, regardless of whether these mixtures comprise water particles or solids suspended in an oil phase.

In Fig. 4 I have illustrated a system wherein at least a portion of the foreign material is deposited on a moving member and then withdrawn from the treating space. A tank 80 is illustrated, one portion of the tank comprising an intake chamber 81 bounded by a porous member 82 and a wall 83. The mixture may be delivered to this intake chamber through a pipe 84 and flow through the porous member and into a treating space 85. An electrode 86 similar to that previously described is mounted on the porous member 82. Similarly, a discharge chamber 87 is formed in the opposite end of the tank 80 being bounded by a filter plate 88 and a wall 89. This filter plate preferably mounts an electrode 90 similar to the electrode 25 previously described.

A roller 91 is shown as being rotatably mounted below the filter plate 88 and a corresponding roller 92 is positioned thereabove and outside the tank 80. A movable member, preferably in the form of a continuous belt 93, extends therearound. One of the rollers is suitably driven so that the belt 93 moves upward adjacent the electrode 90. This belt means is preferably interstitial in character and may be formed of metallic screen as shown. In other instances this belt may be of cloth, preferably formed of a material which is water wettable. It is not, however, necessary that this belt be formed of conducting material in all instances, though if ever it is thus formed it will be clear that the belt can be in actual electrical contact with the electrode 90, if desired. The belt would then in itself comprise an electrode. In other instances the belt can be spaced slightly therefrom as shown. In any event an electric field is established in the treating space 85 as by a battery or other source 96. This field is of such a character as to move the foreign material of the incoming mixture in a direction toward the belt 93 so that it comes into contact therewith and is moved upward as the belt rises. If the foreign particles of the mixture are formed of a solid material, as, for instance, carbon, this material will be deposited on the external surface of the belt and can be removed therefrom by suitable means spaced above the tank 80 and shown as comprising a scraper 97 discharging into a hopper 98. The liquid phase of the mixture moves through the filter plate 88 and into the discharge chamber 87 whence it is withdrawn through a pipe 99.

In the form of the invention shown in Fig. 4 the downward moving portion of the belt 93 is shown as moving through the chamber 87. If this is undesirable a form such as shown in Fig. 5 may be utilized. Here the discharge chamber is indicated by the numeral 101 and is formed by an open-ended shell 102 closed by a filter plate 103 similar to that previously described. A discharge pipe 104 conducts the liquid therefrom. This shell is positioned directly above the lower roller 91 and between the upward and downward moving portions of the belt 93. The entire tank 80 may be filled with liquid to a level indicated by the numeral 106. Also in this form of the invention a scraper 107 may be used for removing any material carried upward by the belt 93, this material sliding down a plate 108 and into a hopper 109.

It is sometimes possible to reverse the direction of flow through the forms shown in Figs. 4 and 5, discharging the pure liquid through the pipe 84 and, if desired, reversing the position of the porous member and filter plate. Usually, however, this is not preferable in view of the fact that the incoming mixture must flow through the belt means before moving into the central portion of the field. However, with a belt of interstitial character, this system can often be used and the belt can thus act as a porous member through which the incoming mixture moves. With such a flow it is usually desirable to maintain the unidirectional field of such character as to return the foreign material to the belt 93 from which it is removed at a position outside the tank 80.

In other instances a belt means may be provided adjacent the porous member 82 as well as the filter plate 88, thus removing from the vicinity of the electrode 86 any foreign matter which might otherwise deposit on this electrode due to the action of the electric field.

I claim as my invention:

1. A method of treating a mixture of a liquid and a suspended material, which method includes the steps of: forming a stream of said mixture moving in a given direction; setting up an electric field acting to move said suspended material in a direction opposite to said given direction and at a velocity greater than the velocity of said stream of said mixture; and collecting said suspended material.

2. A method of treating a mixture of a liquid and a suspended material, which method includes the steps of: forming a stream of said mixture moving in a given direction; setting up an electric field acting to move said suspended material in a direction opposite to said given direction whereby the concentration of said suspended material in said field increases as treatment progresses, the lines of force in said field being substantially parallel to the direction of flow; and removing said suspended matter from said field.

3. A method of treating a mixture of a liquid and a suspended material by the use of a filter plate having interstices of smaller size than the particles of said suspended matter and by the use of a porous member having interstices of larger size than said particles, which method includes the steps of: continuously moving a stream of said mixture through said porous member and toward said filter plate; establishing an electric field of unidirectional character in the space between said porous member and said filter plate and of a character to cataphoretically move said particles in a direction toward said porous member thereby preventing deposit of said particles on said filter plate; and moving said liquid through said filter plate to remove any particles not removed by said electric field.

4. A method of treating a mixture of a liquid and a suspended material by the use of a porous member having interstices of larger size than said suspended material, which method includes the steps of: flowing said mixture continuously through said porous member; and establishing an electric field through which said mixture moves after passing through said porous member, said electric field acting to cataphoretically move the particles of said suspended material in a direction toward said porous member and into contact therewith.

5. A method as defined in claim 4 in which said porous member forms one electrode for establishing said electric field thus bounding said field.

6. A method of electrically treating a mixture to separate the constituents thereof, which method includes the steps of: establishing an alternating and a unidirectional electric field; moving said mixture into the alternating field; partially separating said constituents; moving one of the constituents thus partially separated into said unidirectional field wherein the remaining constituents are separated; and returning by gravity one of said constituents thus separated in said unidirectional field to said alternating field.

7. In combination in an electric separating device for treating a mixture of a liquid and a suspended material: a filter plate; a first electrode disposed adjacent a forward surface of said filter plate; a second electrode disposed in spaced relationship with said first electrode and positioned on the same side of said filter plate as said first electrode; means for moving the suspended particles in a direction away from said filter plate and including means for establishing a potential difference between said electrodes with the potential so maintained that the electric field thus established between said electrodes acts to move the suspended particles to be separated away from said filter plate; means for continuously flowing said mixture in said field toward said filter plate; and means for withdrawing said liquid after it has passed through said filter plate.

8. In combination in an electric separating device for treating a mixture of a liquid and a suspended material: a filter plate providing an interstitial surface of electrical conducting material and forming a first electrode; a second electrode disposed in spaced relationship with said filter plate; means for setting up an electric field between said first and said second electrodes and acting to move the suspended particles to be separated away from said filter plate; means for continuously flowing said mixture in said field toward said filter plate; and means for withdrawing said liquid after it has passed through said filter plate.

9. In combination in an electric separating device for treating a mixture of a liquid and a suspended material: a porous member; a filter plate spaced from said porous member to define a space therebetween; means for flowing said mixture through said porous member and toward said filter plate; and means for establishing a unidirectional electric field in said space to attract said suspended material and prevent deposition of the whole of said suspended material on said filter plate, said liquid moving through said filter plate.

10. In combination in a treater for separating a mixture of a liquid and a suspended material: a tank containing said mixture; a movable interstitial member of electric conducting material and forming a first electrode, the surface of said interstitial member being movable from submerged position in said mixture to a position above said mixture; means for moving said interstitial member to move said surface from said submerged position to said position above said mixture; a second electrode in front of said first electrode; means for establishing an electric field between said electrodes tending to move said suspended material toward said first electrode of interstitial character; a filter means to the rear of said first electrode and receiving the liquid and any unseparated suspended matter passing through said interstitial member; and means for withdrawing said liquid passing through said filter.

11. In combination in a treater for separating a mixture of a liquid and a suspended material: a tank containing said mixture; a movable interstitial member and providing a front portion and another portion spaced therefrom, both portions being in said tank; a filter means between said portions of said movable interstitial member and receiving any liquid and unseparated suspended material moving through said front portion of said movable interstitial member; means for moving said liquid toward said front portion of said movable interstitial member and thence through said filter means and said other portion in succession; and means for withdrawing the purified liquid which passes through said filter means and said other portion of said movable interstitial member.

12. In combination in an electrical treating system for mixtures: means setting up an electric field of alternating character; means for circulating the mixture to be treated in said field; means for establishing an electric field of unidirectional character above said field of alternating character and into which moves at least a part of said mixture for separation of the suspended material therein, said unidirectional and said alternating fields being in open communication whereby the suspended material in said unidirectional field drops to said field of alternating character.

13. In combination in an electric dehydrator: a tank containing a dry-oil zone in the upper end thereof, the emulsion to be treated being in a lower emulsion zone of said tank; an interstitial cylindrical electrode in said dry-oil zone and bounding an electric field; means for moving material inward through the interstices of said cylindrical electrode, at least a portion of said material moving downward from the interior of said cylindrical electrode; and means for establishing an electric field of alternating character in said emulsion zone and to which field said portion of said material reaching the interior of said cylindrical electrode is delivered.

14. A method of treating an emulsion by the use of a cylindrical interstitial electrode, which method includes the steps of: setting up an electric field adjacent said cylindrical electrode moving a treated portion of said emulsion into the interior of said cylindrical electrode through the interstices thereof; establishing an electric field of alternating character below said interstitial electrode; moving at least part of the treated portion of said emulsion entering said interstitial electrode downward from the interior thereof and into said field of alternating character; and introducing additional emulsion to be treated into said field of alternating character.

15. A method of separating the phases of an emulsion by the use of a belt-like interstitial member, which method includes the steps of: first passing said emulsion through one portion of said interstitial member whereby some of the particles of said emulsion are deposited thereon and removed from the emulsion; then moving the remaining emulsion through a filter with small pores to remove additional emulsion particles; moving said interstitial member to present fresh surfaces to said emulsion; and moving the liquid through another portion of said interstitial member after it moves through said filter means.

16. In combination in an electric separating device: a stationary filter means; an interstitial electrically-conducting member in the form of a continuous belt-like member having one side in front of said stationary filter means, said stationary filter means being positioned between opposite sides of said interstitial member; means for movably mounting said interstitial member; means flowing a liquid containing suspended particles toward said interstitial member and thus tending to continue on to said filter means; means for electrically depositing a portion of said particles on said interstitial member, the remaining liquid moving through said stationary filter means, said means including electrode means cooperating with said interstitial member and establishing an electric field in said liquid moving toward said interstitial means; and means for moving said interstitial member to present new deposit-receiving surfaces to said electric field.

17. A method of separating a suspended material from a liquid by use of a filter member providing an interstitial electrically-conducting surface, which method includes the steps of: moving the liquid with its suspended material toward said interstitial electrically-conducting surface; establishing an electric field adjacent said interstitial electrically-conducting surface of sufficient intensity to charge and project at least a portion of the suspended material from said surface in a direction away from this surface; and collecting the liquid after it moves through said filter member.

18. A method of removing suspended impurities from a liquid by the use of a filter and cataphoretic action, which includes the steps of: flowing a stream of said liquid containing said suspended impurities toward one side of said filter so that said liquid flows therethrough; setting up a uni-directional field of sufficient intensity and proper polarity immediately adjacent said side of said filter to cause cataphoretic movement of at least a part of said suspended impurities in said liquid away from said filter in a direction generally opposed to the direction of flow of said liquid through said filter.

19. A method of removing suspended impurities from oil by the use of a filter and cataphoretic action, which includes the steps of: flowing a stream of said oil containing said suspended impurities toward one side of said filter so that said oil flows therethrough; setting up a unidirectional field of sufficient intensity and proper polarity in said stream flowing toward said filter to cause cataphoretic movement of at least a portion of said suspended impurities in a direction opposite to the direction of movement of said stream and away from said filter.

20. A method as defined in claim 1 involving the use of a filter plate toward which said liquid flows and including the step of moving said liquid through such filter plate immediately after subjection to said electric field and as it continues its movement toward said filter plate whereby said electric field moves said suspended material in a direction away from said filter plate.

21. A combination as defined in claim 11 in which said filter means is between and spaced from said portions of said movable interstitial member.

22. In combination in a treater for separating suspended material from a liquid: a tank containing a body of said liquid; an interstitial member movable in said body of liquid and providing front and rear portions spaced from each other; a filter between said portions of said movable interstitial member and receiving any liquid and unseparated suspended material moving through said front portion of said movable interstitial member; means for moving the liquid containing suspended material toward said front portion of said movable interstitial member and thence through said filter means; walls defining a discharge chamber between said portions of said movable interstitial member and receiving the purified liquid issuing from said filter; and means for conducting said purified liquid from said discharge chamber.

FREDERICK GARDNER COTTRELL.

CERTIFICATE OF CORRECTION.

Patent No. 2,116,509. May 10, 1938.

FREDERICK GARDNER COTTRELL.

It is hereby certified that error appears in the printed specification of the above numbered patent requiring correction as follows: Page 5, second column, line 10, claim 14, after the word "electrode" insert a semicolon; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.

side of said filter to cause cataphoretic movement of at least a part of said suspended impurities in said liquid away from said filter in a direction generally opposed to the direction of flow of said liquid through said filter.

19. A method of removing suspended impurities from oil by the use of a filter and cataphoretic action, which includes the steps of: flowing a stream of said oil containing said suspended impurities toward one side of said filter so that said oil flows therethrough; setting up a unidirectional field of sufficient intensity and proper polarity in said stream flowing toward said filter to cause cataphoretic movement of at least a portion of said suspended impurities in a direction opposite to the direction of movement of said stream and away from said filter.

20. A method as defined in claim 1 involving the use of a filter plate toward which said liquid flows and including the step of moving said liquid through such filter plate immediately after subjection to said electric field and as it continues its movement toward said filter plate whereby said electric field moves said suspended material in a direction away from said filter plate.

21. A combination as defined in claim 11 in which said filter means is between and spaced from said portions of said movable interstitial member.

22. In combination in a treater for separating suspended material from a liquid: a tank containing a body of said liquid; an interstitial member movable in said body of liquid and providing front and rear portions spaced from each other; a filter between said portions of said movable interstitial member and receiving any liquid and unseparated suspended material moving through said front portion of said movable interstitial member; means for moving the liquid containing suspended material toward said front portion of said movable interstitial member and thence through said filter means; walls defining a discharge chamber between said portions of said movable interstitial member and receiving the purified liquid issuing from said filter; and means for conducting said purified liquid from said discharge chamber.

FREDERICK GARDNER COTTRELL.

CERTIFICATE OF CORRECTION.

Patent No. 2,116,509. May 10, 1938.

FREDERICK GARDNER COTTRELL.

It is hereby certified that error appears in the printed specification of the above numbered patent requiring correction as follows: Page 5, second column, line 10, claim 14, after the word "electrode" insert a semicolon; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.

CERTIFICATE OF CORRECTION.

Patent No. 2,116,509. May 10, 1938.

FREDERICK GARDNER COTTRELL.

It is hereby certified that error appears in the printed specification of the above numbered patent requiring correction as follows: Page 5, second column, line 10, claim 14, after the word "electrode" insert a semicolon; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.